US008365190B2

(12) United States Patent
Shetty

(10) Patent No.: US 8,365,190 B2
(45) Date of Patent: Jan. 29, 2013

(54) CORRELATED MESSAGE IDENTIFIERS FOR EVENTS

(75) Inventor: Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 12/140,200

(22) Filed: Jun. 16, 2008

(65) Prior Publication Data

US 2009/0313638 A1   Dec. 17, 2009

(51) Int. Cl.
*G06F 3/00* (2006.01)
(52) U.S. Cl. .................. 719/313; 719/314; 719/318
(58) Field of Classification Search .................. None
See application file for complete search history.

(56) References Cited

U.S. PATENT DOCUMENTS

| 7,054,325 | B1  | 5/2006  | Archibald |
|---|---|---|---|
| 2004/0123293 | A1* | 6/2004  | Johnson ......................... 718/101 |
| 2005/0183068 | A1  | 8/2005  | Cwalina et al. |
| 2005/0198127 | A1  | 9/2005  | Helland et al. |
| 2005/0276217 | A1* | 12/2005 | Gadgil et al. ................. 370/225 |
| 2006/0015297 | A1  | 1/2006  | Regnier |
| 2006/0085798 | A1  | 4/2006  | Bendiksen et al. |
| 2006/0140362 | A1  | 6/2006  | Hickson et al. |
| 2007/0156916 | A1* | 7/2007  | Schiefer ......................... 709/232 |
| 2008/0184268 | A1* | 7/2008  | Pietrek et al. ................. 719/318 |
| 2009/0164985 | A1* | 6/2009  | Balko et al. ................... 717/162 |

FOREIGN PATENT DOCUMENTS

| WO | 0227443 A2 | 4/2002 |
|---|---|---|
| WO | 03005200 A1 | 1/2003 |

OTHER PUBLICATIONS

"Design Concepts for Correlating Digital Identities," Internet web site http://technet2.microsoft.com, Jun. 7, 2006.
"Eventlog-MIB," Internet web page originally available at http://www.assure24.com/product/2651-snmp-mibs-download.htm, dated Nov. 7, 2007.

* cited by examiner

*Primary Examiner* — S. Sough
*Assistant Examiner* — Carina Yun
(74) *Attorney, Agent, or Firm* — Steven L. Bennett

(57) ABSTRACT

A message identifier of a first event is provided to a correlation engine. The correlation engine is to correlate the first event to one or more second events according to a predetermined correlation technique. The message identifiers of the second events are received from the correlation engine. A correlated message identified for the first event is generated based on the message identifier of the first event and on the message identifiers of the second events. The correlated message identifier for the first event is output.

7 Claims, 7 Drawing Sheets

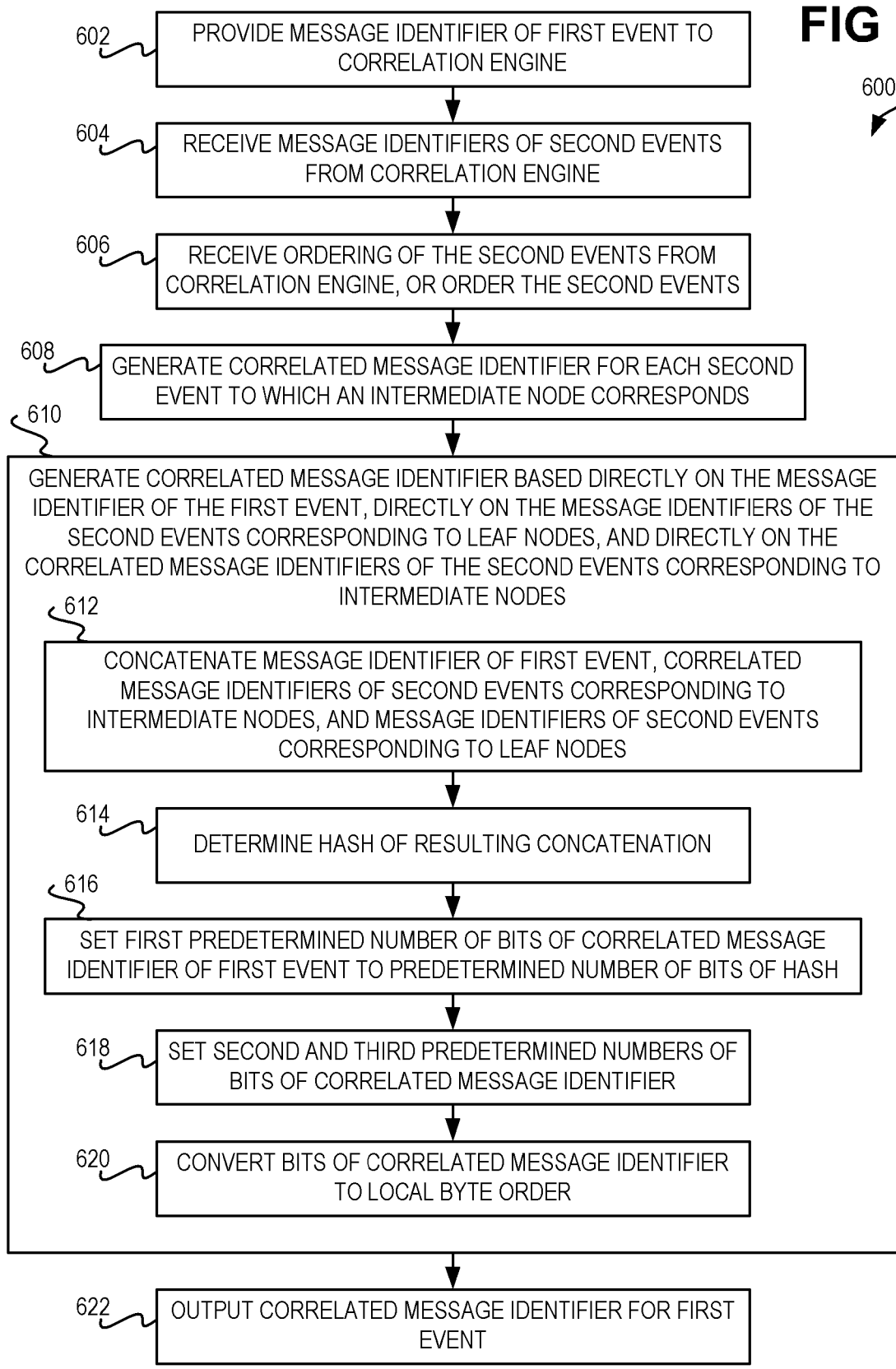

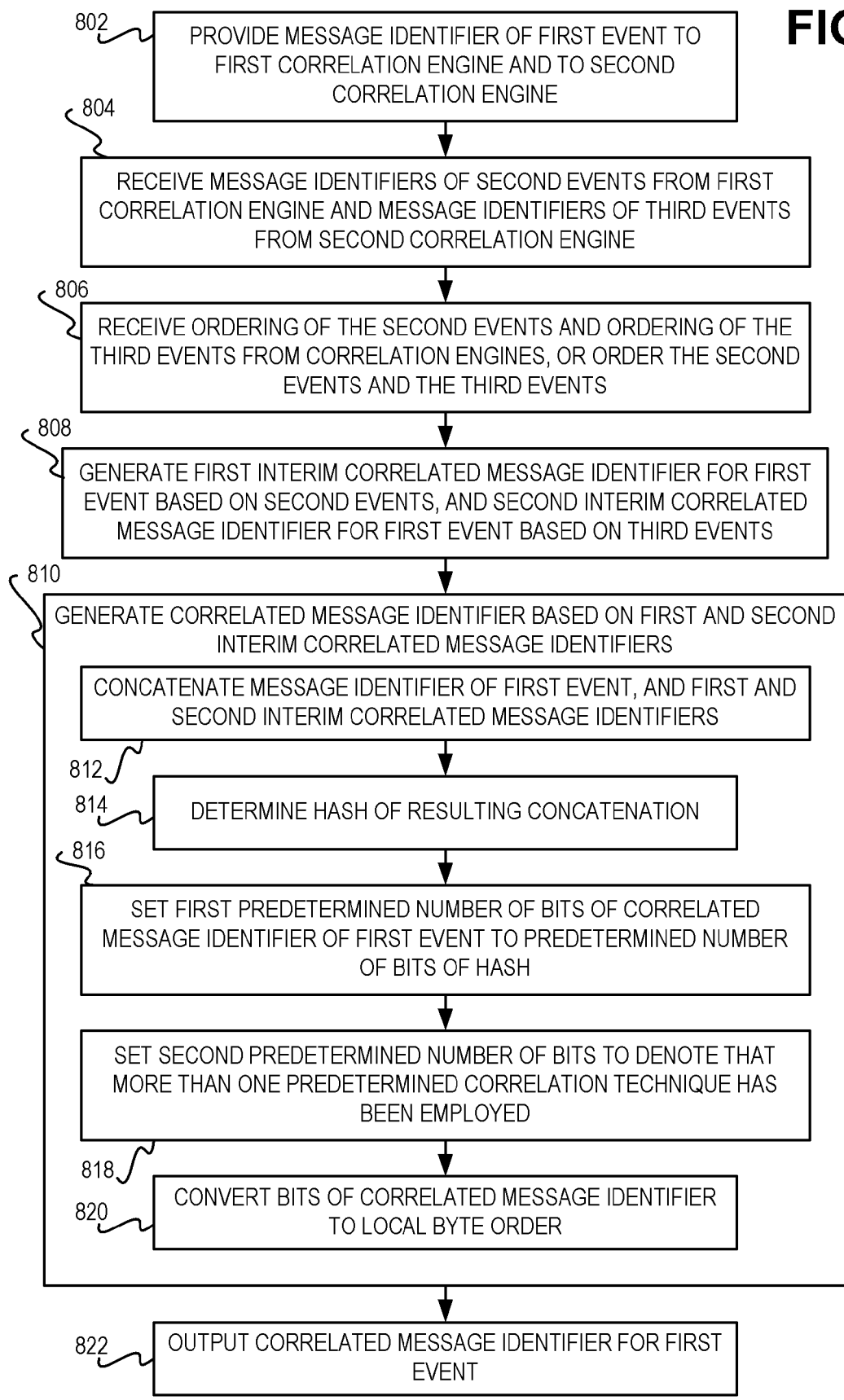

CORRELATED MESSAGE IDENTIFIERS FOR EVENTS

FIELD OF THE INVENTION

The present invention relates generally to an event that is correlated to other events, and more specifically to generating correlated message identifiers for the event based on a message identifier of the event and on message identifiers of the other events.

BACKGROUND OF THE INVENTION

Message identifiers are commonly used to identify messages that are logged within logs, such as error logs. The messages correspond to events. The identifiers are unique and assist in uniquely identifying the information being conveyed within the messages. Message identifiers are employed because the messages themselves may be translated into different languages, or additional information may be added to the messages that make it more difficult to identify the messages.

Message identifiers are commonly used to identify problems that have occurred in computer programs and computer systems, resulting in events being logged in error logs via corresponding messages. In some situations, users can perform searches based on the message identifiers to research the problems. Such searches may be performed in relation to Internet search engines in general, for instance, or in relation to web sites for the computer programs and the computer systems in particular.

Although the message identifiers are useful, they refer to particular messages and thus to particular events. This renders message identifiers ineffective in situations in which identifying a problem is not possible with a single message or a single event. In such situations, multiple messages corresponding to multiple events have to be correlated to actually identify the problem that has occurred. A single message identifier of a single event (i.e., of a single message corresponding to the single event) is unhelpful in these situations because the identifier does not convey the context in which the message was generated.

SUMMARY OF THE INVENTION

The present invention relates to generating correlated message identifiers for events. A method of an embodiment of the invention provides a message identifier of a first event to a correlation engine. The correlation engine correlates the first event to one or more second events according to a predetermined correlation technique. The message identifiers of the second events are received from the correlation engine. A correlated message identifier for the first event is generated based on the message identifier of the first event and on the message identifiers of the second events. The correlated message identifier for the first event is output.

In one embodiment, the first event is directly correlated to all the second events. As such, none of the second events is correlated to any other second event. In this embodiment, the correlated message identifier for the first event is generated based directly on the message identifier of the first event on directly on the message identifiers of the second events.

In another embodiment, there are multiple second events, and the first event is indirectly correlated to at least one of the second events. As such, at least one of the second events is correlated to one or more other of the second events. Thus, the first event and the second events are organized in a directed acyclic graph hierarchy including a root node, at least one intermediate node, and at least one leaf node. The root node corresponds to the first event. Each intermediate node corresponds to a second event that is directly correlated to one or more other second events. Each leaf node corresponds to a second event that is not correlated to any other second event.

In this embodiment, for each intermediate node, a correlated message identifier is generated for the second event to which the intermediate node corresponds. The correlated message identifier for the first event is generated based on the message identifier for the first event. The correlated message identifier for the first event is further generated based on the correlated message identifier for each second event to which the first event is directly correlated and to which an intermediate node corresponds. The correlated message identifier for the first event is also generated based on the message identifier for each second event to which the first event is directly correlated and to which a leaf node corresponds.

In another embodiment, the correlation engine is a first correlation engine and the predetermined correlation technique is a first predetermined correlation technique. The message identifier of the first event is provided to each of one or more second correlation engines. Each second correlation engine correlates the first event to one or more third events according to a different predetermined correlation technique. The message identifiers of the third events are received from each second correlation engine.

In this embodiment, a first interim correlated message identifier for the first event is generated based on the message identifier of the first event and on the message identifiers of the second events. For each second correlation engine, a second interim correlated message identifier for the first event is generated based on the message identifier of the first event and on the message identifiers of the third events for the second correlation engine. The correlated message identifier for the first event is generated based on the first interim correlated message identifier and on each second interim correlated message identifier.

A computerized system of an embodiment of the invention includes one or more correlation engines and a correlated message identifier. Each correlation engine is to receive a message identifier of a first event, to correlate the first event to one or more second events according to a different predetermined correlation technique, and to output message identifiers of the second events. The correlated message identifier generator is to receive the message identifier of the first event, and is to receive the message identifiers of the second events from the correlation engine. The correlated message identifier generator is further to generate a correlated message identifier for the first event, and to output the correlated message identifier for the first event.

An article of manufacture of an embodiment of the invention includes a computer-readable medium and computer usable program code stored within the medium. The medium may be a recordable data storage medium, or another type of tangible computer-readable medium. The computer usable program code is configured to perform the following. The code is configured to provide a message identifier of a first event to a correlation engine, where the correlation engine correlates the first event to one or more second events according to a predetermined correlation technique. The code is also configured to receive the message identifiers of the second events from the correlation engine. The code is configured to then generate a correlated message identifier for the first event, and output this correlated message identifier.

Embodiments of the invention provide for advantages over the prior art. A correlated message identifier is provided that uniquely identifies an event with its context In particular, the correlated message identifier serves to uniquely identify a problem that is associated with an event that is correlated with a number of other events. As such, the correlated message identifier can be used as the subject of a search in the same way the message identifiers are currently used, allowing more complex problems to be researched in this manner. Different correlation techniques can also be used to identify different problems and event relationships, for effective analysis of the underlying problem. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 6 is a flowchart of a method for generating a CMI for an event that is hierarchically correlated to a number of other events, according to an embodiment of the invention.

FIG. 8 is a flowchart of a method for generating a CMI for an event that is correlated to a number of other events in a hybrid manner, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
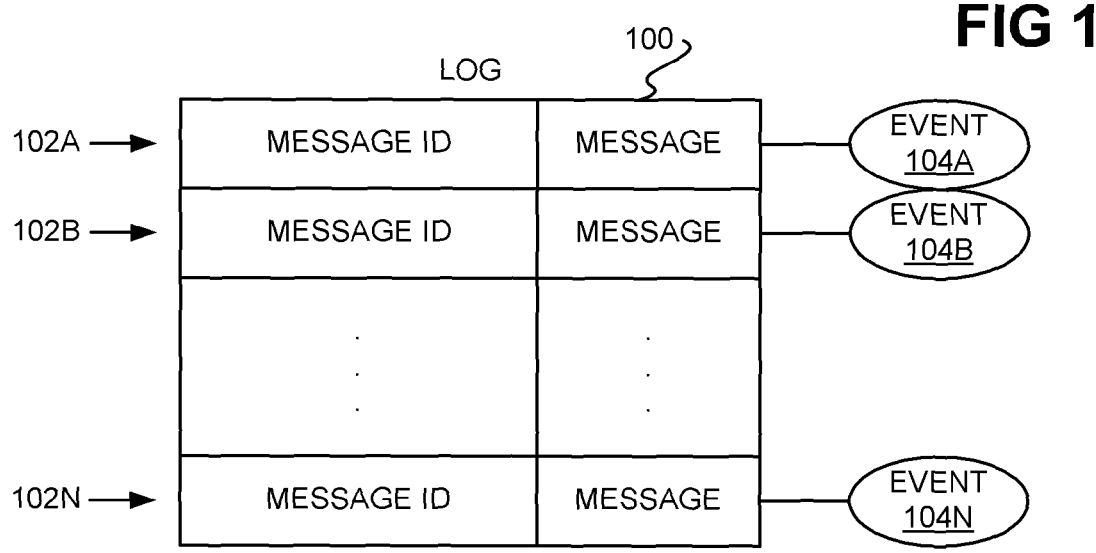
FIG. 1 is a diagram of a log having entries with message identifiers and messages corresponding to events, according to an embodiment of the invention.

FIG. 1 shows a representative log 100, according to an embodiment of the invention. The log 100 may be an error log, such as that for a computer program or a computer system. Events 104A, 104B, ..., 104N, collectively referred to as the events 104, are generated by the computer program or the computer system in question. The events 104 may each represent information regarding the execution of the computer program or the computer system. At least one of the events 104 may, for instance, correspond to an error condition.

The log 100 includes entries 102A, 102B, ..., 102N, collectively referred to as the entries 102, and which correspond to the events 104. Within each entry there is a message, which may be textual information verbosely describing the corresponding event to at least some degree. Within each entry there is a message identifier. The message identifier is a unique identifier, such as a guaranteed-unique identifier (GUID), which identifies the corresponding message and thus the corresponding event. For example, when there is an overflow of a buffer in executing a computer program, this event may be described by the message "buffer overflow," and may have a unique message identifier ABCD associated with it. Difference instances of the same message and event may nevertheless have the same unique message identifier.

Figure 2:
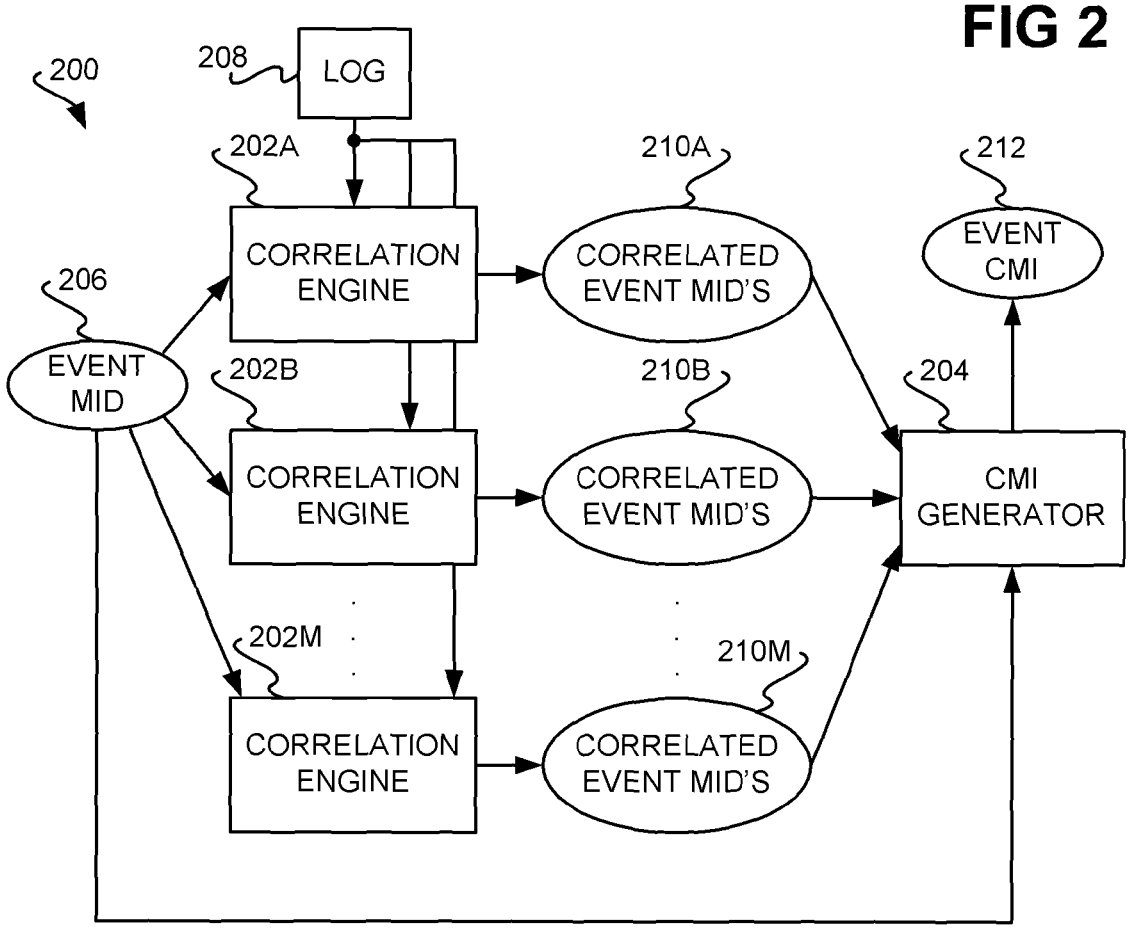
FIG. 2 is a diagram of a system for generating a correlated message identifier (CMI) for an event, according to an embodiment of the invention.

FIG. 2 shows a system 200, according to an embodiment of the invention. The system 200 includes one or more correlation engines 202A, 202B, ..., 202M, collectively referred to as the correlation engines 202, as well as a correlation message identifier (CMI) generator 204. Each of the engines 202 and the CMI generator 204 may be implemented in hardware, software, or a combination of hardware and software. For instance, each of the engines 202 and the CMI generator 204 may be one or more computer programs executed by one or more processors from a computer-readable medium, as can be appreciated by those of ordinary skill within the art.

The message identifier for a desired event, referred to as the event message identifier (MID) 206, is input into each of the correlation engines 202. That is, it can be said that the correlation engines 202 each receive the event MID 206. An entire log 208 may also be received by each of the correlation engines 202. The correlation engines 202 each perform a different correlation technique to correlate the event having the event MID 206 with one or more other events identified in the log 208. The manner by which the correlation engines 202 perform correlation, and the particular correlation techniques themselves, are not limited by embodiments of the invention.

The correlation engines 202 output correlated event MID's 210A, 210B, ... 210M, respectively, and which are collectively referred to as the correlated event MID's 210. Each of the MID's 210 is the message identifier of an event to which the event having the event MID 206 is correlated. The event of each of the MID's 210 may be selected from one of the events identified in the log 208, for instance. It is noted that because the correlation engines 202 perform different correlation techniques, the event MID's 210A may be different than the event MID's 210B, which may be different than the event MID's 210C, and so on. That is, a given correlation engine may generate a different set of correlated event MID's for a given event MID 206, and thus which correspond to the event having the event MID 206 being correlated to one or more given events by the engine in question.

The event MID 206 and the correlated event MID's 210 are input into the CMI generator 204. In turn, the CMI generator 204 generates an event correlated message identifier (CMI) 212. The CMI 212 is for the event having the event MID 206, and represents the contextual scenario in which this event was generated. As such, the CMI generator 204 generates the CMI 212 based on the event MID 206 and based on the correlated event MID's 210. The manners by which a CMI may be generated in different embodiments of the invention are now described.

Figure 3:
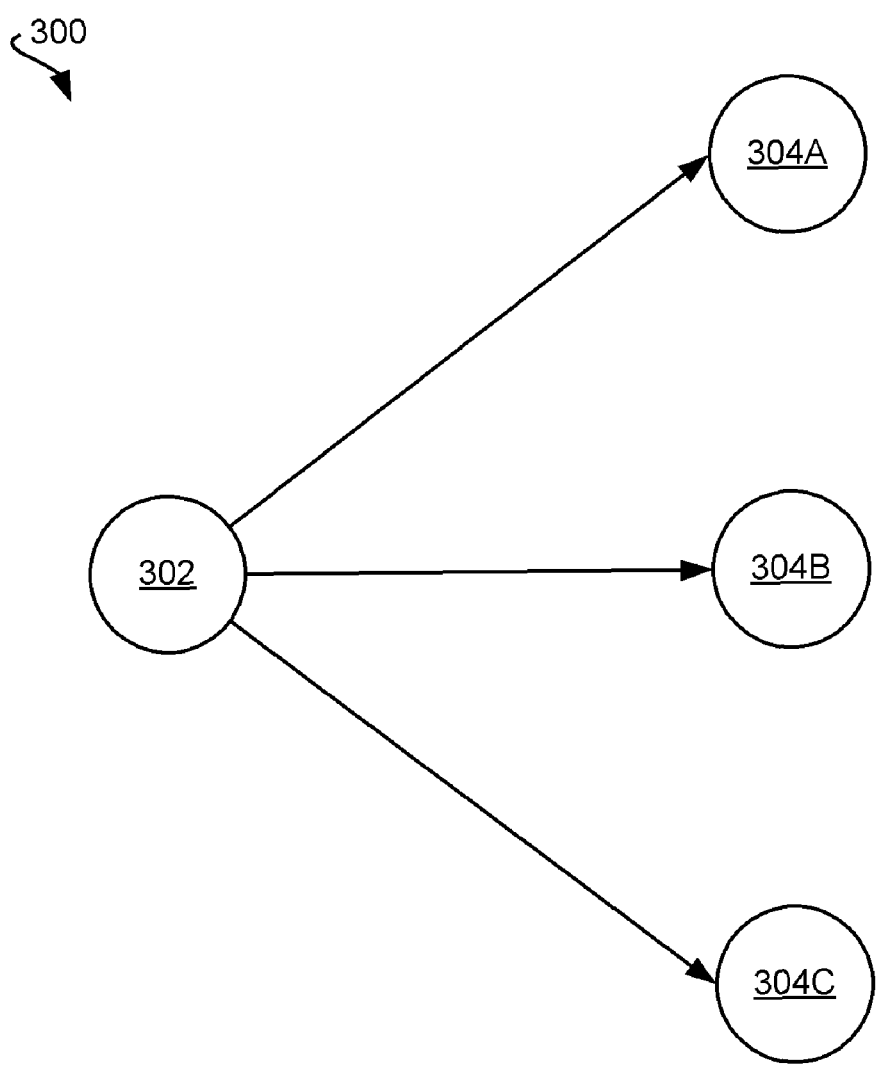
FIG. 3 is a diagram of an exemplary simple correlation between one event and a number of other events, according to an embodiment of the invention.

FIG. 3 shows what is referred to as a simple correlation 300 of an event 302 to a number of events 304A, 304B, and 304C, collectively referred to as the events 304, according to an embodiment of the invention. As such, what is referred to as a simple CMI is generated for the event 302. A simple correlation is one in which the events 304 to which the event 302 is correlated are such that the event 302 directly correlates to each of the events 304, and none of the events 304 are correlated to other of the events 304. For example, the event 302 is directly correlated to the event 304A because there is no intervening event between the events 302 and 304A. Likewise, there is no correlation of the event 304A to the event 304B or to the event 304C. While there are three events 304 to which the event 302 is correlated in FIG. 3, there can be more or less than three such events 304 in general.

Figure 4:
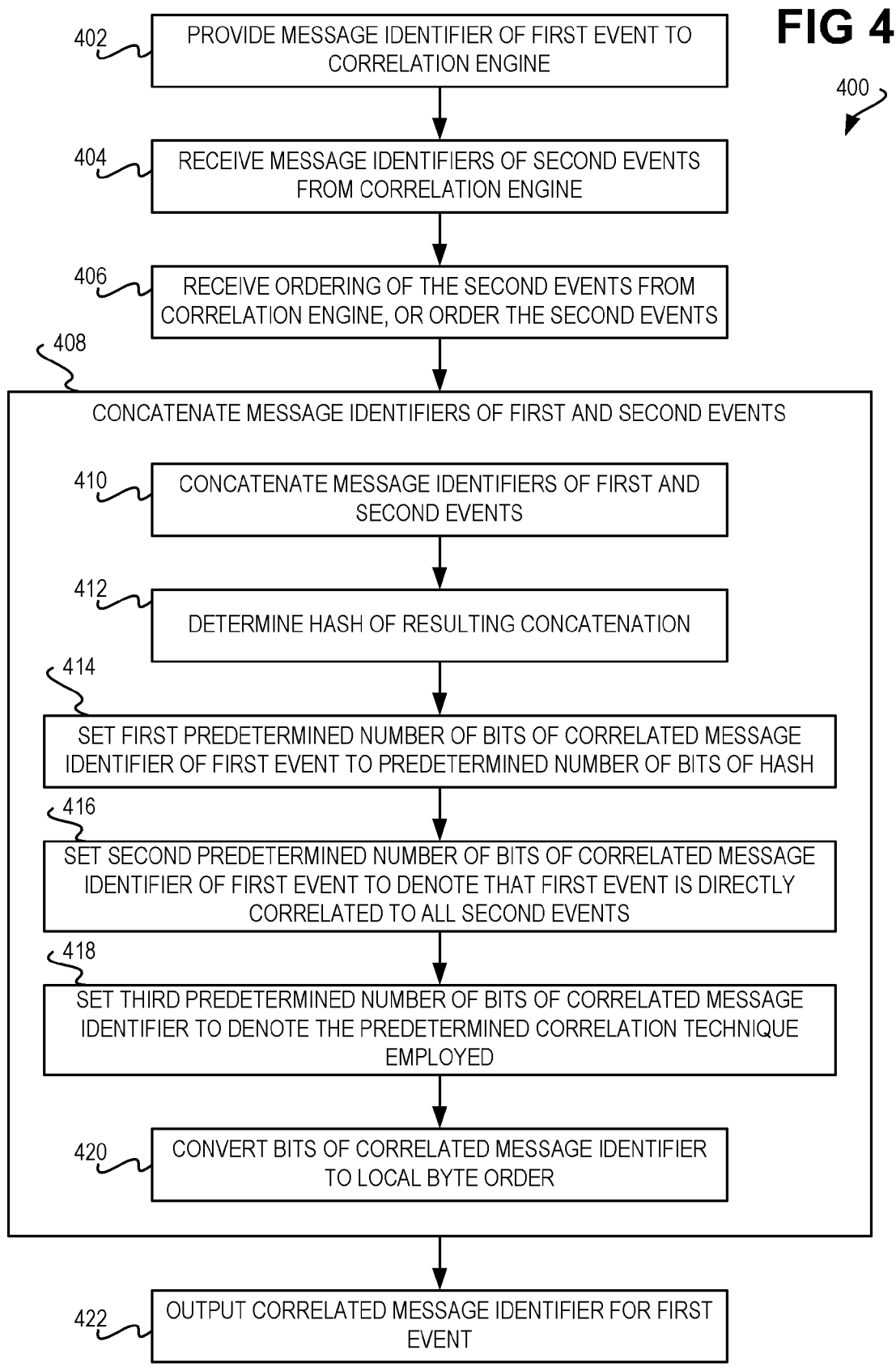
FIG. 4 is a flowchart of a method for generating a CMI for an event that is simply correlated to a number of other events, according to an embodiment of the invention.

FIG. 4 shows a method 400 for generating a simple CMI for a first event that is simply correlated to one or more second events, according to an embodiment of the invention. The method 400 may be implemented as one or more computer programs executed by one or more processors from a computer-readable medium. The CMI generator 204 may perform at least some parts of the method 400 in one embodiment of the invention.

The message identifier of the first event is provided to a single correlation engine (402), such as one of the correlation engines 202 that have been described. In response, the message identifiers of the second events are received from the correlation engine (404), such as the correlated event MID's 210A, 210B, or 210M. The correlation engine determines that the first event is directly correlated to the second events, and returns the message identifiers of these second events.

A particular ordering of the message identifiers of the second events may be received from the correlation engine, or alternatively the message identifiers may be particularly ordered by the method 400 itself (406). In either case, the CMI for the first event is generated based directly on the message identifier of the first event and directly on the message identifiers of the second events (408). In one embodiment, this is achieved as follows.

First, the message identifiers of the first and the second events are concatenated (410), where the message identifiers are ordered such that the message identifier of the first event is succeeded by the message identifiers of the second events in the order determined in part 406. A hash of the resulting concatenation is determined or calculated (412). For example, an MD5 [3]/SHA-1 [8] hash algorithm may be employed in one embodiment, as can be appreciated by those of ordinary skill within the art.

A first number of predetermined bits of the CMI being generated are set to a predetermined number of bits of the hash (414). For example, the 0-15 octet of the CMI may be set equal to the 0-15 octet of the hash, as can be appreciated by those of ordinary skill within the art. Next, a second number of predetermined bits of the CMI being generated may be set to denote the fact that the first event is directly correlated to all the second events that have been identified (416). For example, bits 67, 68, and 69 of the CMI being generated may be logically exclusively OR'ed (XOR'ed) with bits 70, 71, and 72 of the CMI, and the results stored in bits 67, 68, and 69 of the CMI. Bits 70, 71, and 72 of the CMI may then be set to particular values, such as 0, 0, and 1, in one embodiment.

Thereafter, a third number of predetermined bits of the CMI being generated are set to denote the particular correlation technique that was employed by the correlation engine in correlating the first event to the second events (418). This information may be known a priori, or the correlation engine may output this information along with the message identifiers of the second events. For example, bits 49, 50, 51, and 52 of the CMI being generated may be exclusively OR'ed (XOR'ed) with bits 53, 54, 55, and 56, and the results stored in bits 49, 50, 51, and 52 of the CMI. Bits 53, 54, 55, and 56 may then be set to a four-bit signature that identifies the predetermined correlation technique in question. Finally, the bits of the CMI of the first event that has been generated may be converted to local byte order (420), as can be appreciated by those of ordinary skill within the art.

The CMI for the first event as has been generated is output (422). For example, the CMI may be displayed to the user on a display device of a computing device. As another example, the CMI may be printed by a printing device on a sheet of media. The user can then use the CMI for the first event to research the underlying cause of a problem that has occurred, for example, knowing that the CMI takes into account the contextual situation in which the first event was generated.

Figure 5:
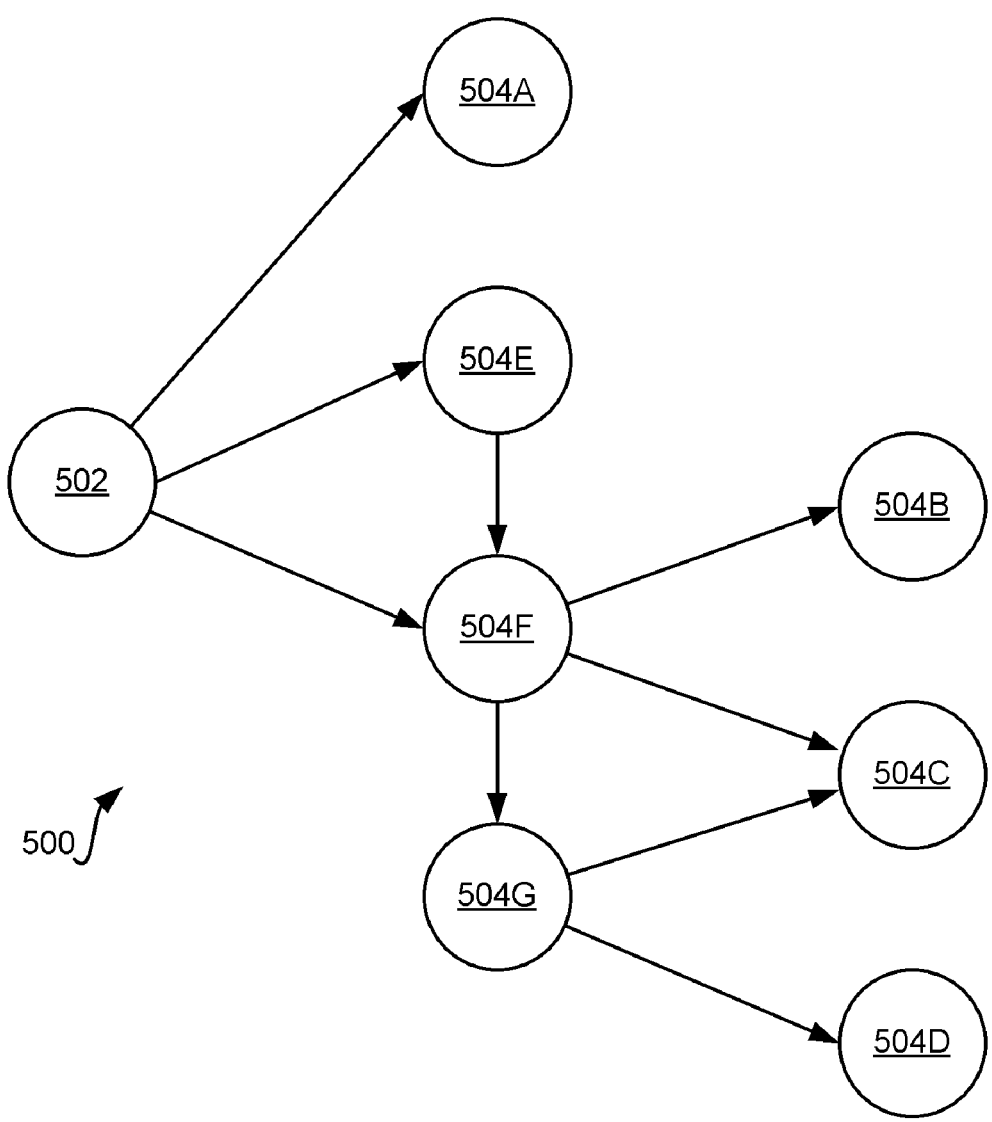
FIG. 5 is a diagram of an exemplary hierarchical correlation between one event and a number of other events, according to an embodiment of the invention.

FIG. 5 shows what is referred to as a hierarchical correlation 500 of an event 502 to a number of events 504A, 504B, 504C, 504D, 504E, 504F, and 504G, collectively referred to as the events 504, according to an embodiment of the invention. As such, what is referred to as a hierarchical CMI is generated for the event 502. A hierarchical correlation is one in which the event 502 is indirectly correlated to at least one of the events 504, such that at least one of the events 504 is correlated to one or more of the other events 504. For example, the event 502 is directly correlated to the events 504A, 504E, 504F, and 504G, but is indirectly correlated to the events 504B, 504C, and 504D. This is because the nodes 504E and/or 504F are situated between the events 502 and 504B, the nodes 504E, 504F, and/or 504G are situated between the events 502 and 504C, and the events 504E, 504F, and/or 504G are situated between the events 502 and 504D.

Furthermore, the event 504E is directly correlated to the event 504F, which is directly correlated to the events 504B, 504C, and 504G. The event 504G is itself directly correlated to the events 504C and 504D. Thus, the hierarchical correlation 500 forms a directed acyclic graph, as can be appreciated by those of ordinary skill within the art. While there are seven events 504 in FIG. 5, there can be more or less than seven such events 504 in general, but there are at least two such events 504.

Within the hierarchical correlation 500, the event 502 is a root node of the directed acyclic graph, because no other event is correlated to the event 502. The events 504A, 504B, 504C, and 504D are leaf nodes of the directed acyclic graph, because these events do not correlate to any other event. The events 504E, 504F, and 504G are intermediate, or branch, nodes of the directed acyclic graph, because at least one other event is correlated to each of these events, and each of these events is corrected to another event.

FIG. 6 shows a method 600 for generating a hierarchical CMI for a first event that is hierarchically correlated to a number of second events, according to an embodiment of the invention. The method 600 may be implemented as one or more computer programs executed by one or more processors from a computer-readable medium. The CMI generator 204 may perform at least some parts of the method 600 in one embodiment of the invention.

The message identifier of the first event is provided to a single correlation engine (602), such as one of the correlation engines 202 that have been described. In response, the message identifiers of the second events are received from the correlation engine (404), such as the correlated event MID's 210A, 210B, or 210M. The correlation engine determines that the first event is hierarchically correlated to the second events, and returns the message identifiers of these second events.

A particular ordering of the message identifiers of the second events may be received from the correlation engine, or alternatively the message identifiers may be particularly ordered by the method 600 itself (606). In either case, a CMI is generated for each second event to which an intermediate node corresponds (608). In the example of FIG. 5, for instance, a CMI for the event 504G is determined based on the message identifiers of the event 504G, 504C, and 504D. The CMI for the event 504G is a simple CMI, because the event 504G directly correlates to the events 504C and 504D, which correspond to leaf nodes.

A CMI for the event 504F is determined based on the message identifiers of the events 504F, 504B, and 504C, and based on the simple CMI for the event 504G. The CMI for the event 504F is a hierarchical CMI, because the event 504F correlates to the events 504B, 504C, and 504G, and in particular the event 504G corresponds to an intermediate node, not to a leaf node. A CMI for the event 504E is determined based on the message identifier of the event 504E, and based on the hierarchical CMI of the event 504F. The CMI for the event 504E is also a hierarchical CMI, because the event 504E correlates to the event 504F, which corresponds to an intermediate node and not to a leaf node.

In general then, the CMI for a second event to which an intermediate node corresponds is determined based on the message identifier for this second event, and based on an identifier of each other second event to which the second event in question directly correlates. The identifier of another second event that is used in this determination is a CMI itself if this other second event corresponds to an intermediate node. By comparison, the identifier of another second event that is used in this determination is a message identifier if this other second event corresponds to a leaf node For instance, in the example of FIG. 5, the node 504F directly correlates to the nodes 504B, 504C, and 504G. The message identifiers for the nodes 504B and 504C are used to determine the CMI for the node 504F, because the nodes 504B and 504C are leaf nodes. By comparison, the CMI for the node 504G is used to determine the CMI for the node 504F, because the node 504G is an intermediate node. The message identifier for the node 504F is itself also used in this determination. It is noted that the manner by which the CMI for the event corresponding to an intermediate node can be equivalent to the manner by which the CMI for the first event corresponding to a root node is determined, as is describe next.

Next, the hierarchical CMI for the first event is generated based directly on the message identifier of the first event, directly on the message identifiers of the second events corresponding to leaf nodes and to which the first event is directly correlated, and directly on the CMI's of the second events corresponding to intermediate nodes and to which the first event is directly correlated (610). For example, in FIG. 5, the event 502 directly correlates to the events 504A, 504E, and 504F. The message identifier for the event 502 is used to generate the CMI for the event 502. The message identifier for the event 504A is also used to generate the CMI for the event 502, because the event 504A is a leaf node. The CMI's for the events 504E and 504F are used to generate the CMI for the event 502, because the events 504E and 504R are intermediate nodes.

In one embodiment, the hierarchical CMI for the first event is generated as follows. First, the message identifier of the first event, the CMI's of the second events corresponding to intermediate nodes and to which the first event is directly correlated, and the message identifiers of the second events corresponding to leaf nodes and to which the first event is directly correlated (612). A hash of the resulting concatenation is determined or calculated (614). For example, an MD5 [3]/SHA-1 [8] hash algorithm may be employed in one embodiment.

A first number of predetermined bits of the CMI being generated are set to a predetermined number of bits of the hash (616). For example, the 0-15 octet of the CMI may be set equal to the 0-15 octet of the hash, as can be appreciated by those of ordinary skill within the art. Next, a particular second number of bits and a particular third predetermined number of bits of the CMI being generated are set (618). For example, the second number of bits may be set to denote the fact that the first event is hierarchically correlated to the second events that have been identified. Bits 67, 68, and 69 of the CMI being generated may be logically exclusively OR'ed (XOR'ed) with bits 70, 71, and 72 of the CMI, and the results stored in bits 67, 68, and 69. Bits 70, 71, and 72 may then be set to particular values, such as 0, 1, and 0, in one embodiment.

The third number of bits may be set to denote the particular correlation technique that was employed by the correlation engine in correlating the first event to the second events. This information may be known a priori, or the correlation engine may output this information along with the message identifiers of the second events. For example, bits 49, 50, 51, and 52 of the CMI being generated may be exclusively OR'ed (XOR'ed) with bits 53, 54, 55, and 56, and the results stored in bits 49, 50, 51, and 52 of the CMI. Bits 53, 54, 55, and 56 may then be set to a four-bit signature that identifies the predetermined correlation technique in question. Finally, the bits of the CMI of the first event that has been generated may be converted to local byte order (620).

The CMI for the first event as has been generated is output (622). For example, the CMI may be displayed to the user on a display device of a computing device. As another example, the CMI may be printed by a printing device on a sheet of media. The user can then use the CMI for the first event to research the underlying cause of a problem that has occurred, for example, knowing that the CMI takes into account the contextual situation in which the first event was generated.

Figure 7A:
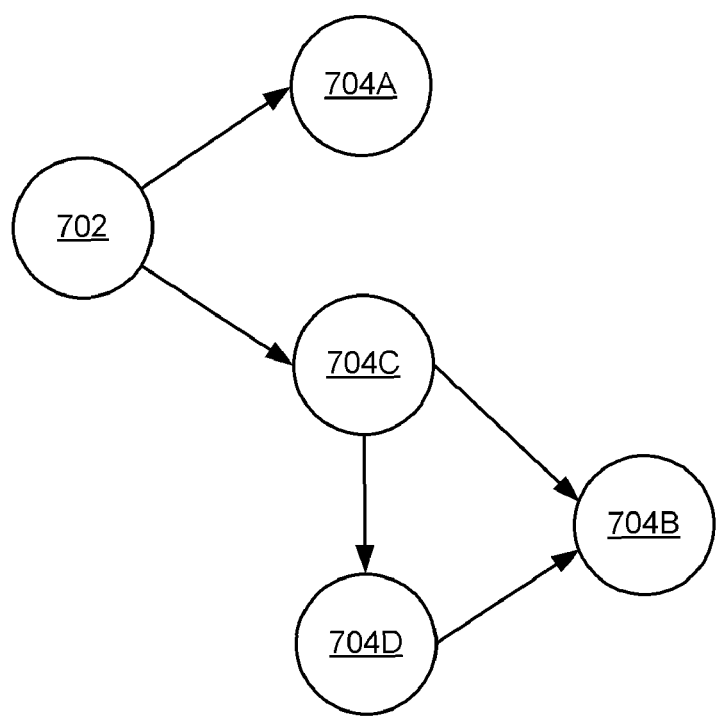
FIGS. 7A and 7B are diagrams depicting in sum an exemplary hybrid correlation between one event and a number of other events, according to an embodiment of the invention.
Figure 7B:
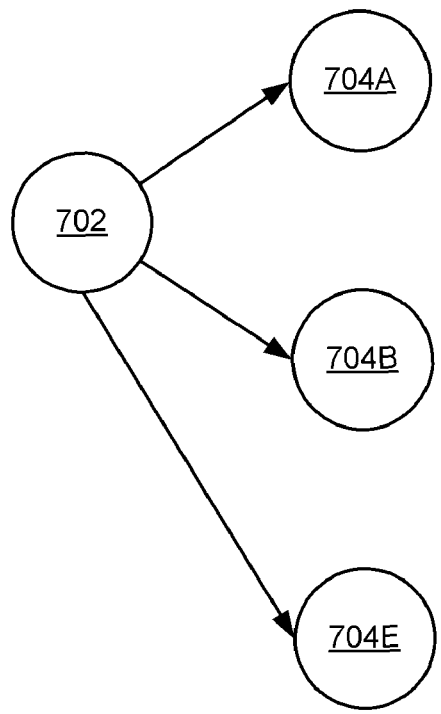

FIGS. 7A and 7B together show what is referred to as a hybrid correlation of an event 702 to a number of events 704A, 704B, 704C, 704D, and 704E, collectively referred to as the events 704, according to an embodiment of the invention. As such, what is referred to as a hybrid CMI is generated for the event 702. A hybrid correlation is one in which more than one correlation technique has been used to correlate the event 702 to the events 704. For example, in FIG. 7A, a first correlation technique has been used to correlate the event 702 to the events 704A, 704B, 704C, and 704D, whereas in FIG. 7B a second and different correlation technique has been used to correlate the event 702 to the events 704A, and 704E.

It is noted that the events 704C and 704D are not present in FIG. 7B, whereas the event 704E is not present in FIG. 7A. Thus, different correlation techniques may result in different events being determined as to which the event 702 correlates. In both of the examples of FIGS. 7A and 7B, furthermore, the events 704A and 704B are present. Thus, different correlation techniques may also result in some of the same events being determined as to which the event 702 correlates.

FIG. 8 shows a method 800 for generating a hybrid CMI for a first event that is hybrid-correlated to a number of second and third events, according to an embodiment of the invention. The method 800 may be implemented as one or more computer programs executed by one or more processors from a computer-readable medium. The CMI generator 204 may perform at least some parts of the method 800 in one embodiment of the invention. The method 800 is described in relation to two different correlation techniques being employed to determine the second events to which the first event is correlated. However, those of ordinary skill within the art can appreciate that the method 800 can easily be extended to more than two different correlation techniques being used.

The message identifier of the first event is provided to a first correlation engine and to a second correlation engine (802), such as two different engines of the correlation engines 202 performing different correlation techniques that have been described. It is noted that even if a given correlation engine performs more than one different correlation technique by itself, for the purposes of this patent application, it can be said that the message identifier of the first event is provided to more than one correlation engine. That is, insofar as a given correlation engine performs more than one different correlation technique by itself, it is at least functionally equivalent to there being more than one correlation engine.

In response, the message identifiers of the second events and the third events are received from the correlation engines (804), such as the correlated event MID's 210A and 210B, 210A and 210M, or 210B and 210M. Because two different correlation engines have been used, it is said that the first event is hybrid-correlated to the second events. In the example of FIGS. 7A and 7B, the events 704A, 704B, 704C, and 704D may be second events to which the event 702 has been correlated by a first correlation engine, and the events 704A, 704B, and 704E may be third events to which the event 702 has been correlated by a second correlation engine. Thus, the events 704A and 704B are both second events and third events in this example.

A particular ordering of the message identifiers of the second events and third events may be received from the correlation engines, or alternatively the message identifiers may be particularly ordered by the method 800 itself (806). In either case, a first interim CMI is generated for the first event as correlated to the second events, and a second interim CMI is generated for the first event as correlated to the third events (808). In the example of FIG. 7A, the interim CMI is a hierarchical CMI, since the event 702 indirectly correlates to the event 704B, and this interim CMI is generated as has been described in relation to FIG. 6 above. By comparison, in the example of FIG. 7B, the interim CMI is a simple CMI, since the event 702 is directly correlated to all the events 704A, 704B, and 704E, and this interim CMI is generated as has been described in relation to FIG. 3 above.

The CMI for the first event is then generated based on the first and second interim CMI's (810). In one embodiment, this is achieved as follows. First, the message identifier of the first event, and the first and second interim CMI's are concatenated (812). A hash of the resulting concatenation is determined or calculated (814). For example, an MD5 [3]/SHA-1 [8] hash algorithm may be employed in one embodiment.

A first number of predetermined bits of the CMI being generated are set to a predetermined number of bits of the hash (816). For example, the 0-15 octet of the CMI may be set equal to the 0-15 octet of the hash, as can be appreciated by those of ordinary skill within the art. Next, a second number of predetermined bits of the CMI being generated may be set to denote the fact that more than one predetermined correlation technique has been employed (818). For example, bits 67, 68, and 69 of the CMI being generated may be logically exclusively OR'ed (XOR'ed) with bits 70, 71, and 72 of the CMI, and the results stored in bits 67, 68, and 69 of the CMI. Bits 70, 71, and 72 of the CMI may then be set to particular values, such as 0, 1, and 1, in one embodiment. Finally, the bits of the CMI of the first event that has been generated may be converted to local byte order (820), as can be appreciated by those of ordinary skill within the art.

The CMI for the first event as has been generated is output (822). For example, the CMI may be displayed to the user on a display device of a computing device. As another example, the CMI may be printed by a printing device on a sheet of media. The user can then use the CMI for the first event to research the underlying cause of a problem that has occurred, for example, knowing that the CMI takes into account the contextual situation in which the first event was generated.

It is finally noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
   providing a message identifier of a first event to a correlation engine, the correlation engine configured to correlate the first event to one or more second events according to a predetermined correlation technique;
   receiving message identifiers of the second events from the correlation engine;
   generating a correlated message identifier for the first event based on the message identifier of the first event and on the message identifiers of the second events; and,
   outputting the correlated message identifier for the first event;
   wherein the first event is directly correlated to all the second events, such that none of the second events is correlated to any other second event, generating the correlated message identifier for the first event is based directly on the message identifier of the first event and directly on the message identifiers of the second events;
   and wherein generating the correlated message identifier for the first event comprises:
   concatenating the message identifier of the first event and the message identifiers of the second events, resulting in a concatenation;
   determining a hash of the concatenation;
   setting a first predetermined number of bits of the correlated message identifier for the first event equal to a predetermined number of bits of the hash of the concatenation;
   setting a second predetermined number of bits of the correlated message identifier for the first event to denote that the first event is directly correlated to all the second events such that none of the second events is correlated to any other second event; and,
   setting a third predetermined number of bits of the correlated message identifier for the first event to denote the predetermined correlation technique employed by the correlation engine.

2. The method of claim 1, further comprising receiving an ordering of the message identifiers of the second events from the correlation engine.

3. The method of claim 1, further comprising where an ordering of the message identifiers of the second events is not received from the correlation engine, ordering the message identifiers of the second events.

4. The method of claim 1, wherein generating the correlated message identifier for the first event comprises converting all bits of the correlated message identifier for the first event to local byte order.

5. The method of claim 1, wherein the correlation engine is a first correlation engine and the predetermined correlation technique is a first predetermined correlation technique, the method further comprising:
- providing the message identifier of the first event to each of one or more second correlation engines, each second correlation engine to correlate the first event to one or more third events according to a different second predetermined correlation technique;
- receiving message identifiers of the third events from each second correlation engine;
- generating a first interim correlated message identifier for the first event based on the message identifier of the first event and on the message identifiers of the second events; and,
- for each second correlation engine, generating a second interim correlated message identifier for the first event based on the message identifier of the first event and on the message identifiers of the third events for the second correlation engine,
- wherein generating the correlated message identifier for the first event is based on the first interim correlated message identifier for the first event and on each second interim correlated message identifier for the first event.

6. A method comprising:
- providing a message identifier of a first event to a correlation engine, the correlation engine configured to correlate the first event to one or more second events according to a predetermined correlation technique;
- receiving message identifiers of the second events from the correlation engine;
- generating a correlated message identifier for the first event based on the message identifier of the first event and on the message identifiers of the second events;
- outputting the correlated message identifier for the first event;
- wherein the correlation engine is a first correlation engine and the predetermined correlation technique is a first predetermined correlation technique, the method further comprising:
  - providing the message identifier of the first event to each of one or more second correlation engines, each second correlation engine to correlate the first event to one or more third events according to a different second predetermined correlation technique;
  - receiving message identifiers of the third events from each second correlation engine;
  - generating a first interim correlated message identifier for the first event based on the message identifier of the first event and on the message identifiers of the second events;
  - for each second correlation engine, generating a second interim correlated message identifier for the first event based on the message identifier of the first event and on the message identifiers of the third events for the second correlation engine;
- wherein generating the correlated message identifier for the first event is based on the first interim correlated message identifier for the first event and on each second interim correlated message identifier for the first event,
- and wherein generating the correlated message identifier for the first event comprises:
  - concatenating the first interim correlated message identifier for the first event and each second interim correlated message identifier for the first event, resulting in a concatenation;
  - determining a hash of the concatenation;
  - setting a first predetermined number of bits of the correlated message identifier for the first event equal to a predetermined number of bits of the hash of the concatenation; and,
  - setting a second predetermined number of bits of the correlated message identifier for the first event to denote that more than one predetermined correlation technique has been employed.

7. The method of claim 6, wherein generating the correlated message identifier for the first event comprises converting all bits of the correlated message identifier for the first event to local byte order.

* * * * *